2,810,754
SYNTHESIS OF L-GLUTAMINE FROM L-GLUTAMIC ACID

Robert W. H. Chang, St. Paul, and Norval G. Barker, Robbinsdale, Minn., assignors to General Mills, Inc., a corporation of Delaware No Drawing. Application June 29, 1955,
Serial No. 518,963

4 Claims. (Cl. 260—534)

The present invention relates to the conversion of L-glutamic acid to L-glutamine by a series of reactions including (1) converting glutamic acid to a multivalent metal complex to block the amino group and the adjacent carboxyl group, (2) reacting the complex with a carbodi-imide, (3) subjecting the intermediate thus produced to ammonolysis to yield the complex of glutamine, and (4) recovering the free glutamine from the complex.

It is, therefore, an object of the present invention to provide a novel process of producing L-glutamine from L-glutamic acid by forming a heavy metal complex of glutamic acid and then reacting the complex with a carbodi-imide.

While the invention is applicable to complexes of multivalent metals in general, including copper, nickel, iron, magnesium, cobalt, calcium, mercury, aluminum, chromium and the like, the copper complex is preferred and, accordingly, the invention will be described with particular reference to this complex. Similarly, any carbodi-imide may be used, since the groups attached to the carbodi-imide group, —N=C=N—, are inert during the reaction and are not involved in the reaction. Typical substituents on the carbodi-imide include alkyl groups, such as methyl, ethyl, isopropyl, butyl, and the like; cycloaliphatic groups such as cyclohexyl, and the like; and aromatic groups such as p-tolyl, benzyl. A readily available compound is dicyclohexyl carbodi-imide and, accordingly, the invention will be described with particular reference to this compound.

The reaction which is postulated is as follows:

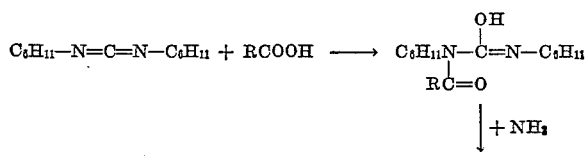

$$C_6H_{11}-N=C=N-C_6H_{11} + RCOOH \longrightarrow C_6H_{11}N-\overset{\overset{\displaystyle OH}{|}}{C}=N-C_6H_{11}$$
$$\underset{R\overset{|}{C}=O}{}$$

$$\Big| + NH_3$$

glutamine $\longleftarrow$ RCONH$_2$ + C$_6$H$_{11}$NHCONHC$_6$H$_{11}$ in which RCOOH is the copper complex of glutamic acid.

The conversion of the glutamic acid to the copper complex may be accomplished by simply mixing the glutamic acid with an aqueous suspension of a cupric compound under neutral conditions. The complex is soluble and may be seperated from excess cupric compound by allowing the insoluble cupric compound to settle. The solution of the complex is then mixed with the carbodi-imide for a short time at room temperature after which ammonia is added with agitation. The urea compound which forms, is insoluble and may be filtered off. The filtrate contains the copper complex of glutamine. The free glutamine may be recovered by passing the solution over an ion exchange resin in the ammonium form, to remove the copper. The glutamine may be recovered from the effluent by any suitable means as, for example, by concentration and crystallization. The presence of glutamine in the solution may readily be detected by chromatography.

Example 1

One half gram of glutamic acid and 0.4 gram of cupric hydroxide were mixed in 10 cc. of water to form the copper complex of glutamic acid. Two grams of dicyclohexyl carbodi-imide was added and the reaction mixture stirred at room temperature for 10 minutes. 3 cc. of 28% NH$_4$OH was added and the mixture was allowed to stand at room temperature overnight. The dicyclohexyl urea which precipitated was removed by filtration and the filtrate was passed through a sulfonic acid exchange resin (Dowex 50, X–8) in the ammonium form to remove copper. The effluent was chromatographed on paper and the chromatogram showed the presence of glutamine.

The process may be carried out under essentially the same conditions with other multivalent complexes of glutamic acid and with other carbodi-imides to produce essentially the same results. Considerable variation is possible in the reaction conditions. The temperature may conveniently be at room temperature although somewhat more elevated temperatures up to the point at which the various compounds in the reaction tend to decompose may be employed. Similarly, the reaction is conveniently carried out in aqueous solution. It will be apparent, however, that considerable variation is possible in the concentration of the reactants.

The method possesses a number of advantages, including the following:

(1) The alphacarboxyl and the amino group of glutamic acid can readily be protected by forming the metal complex after which these two reactive groups do not enter reaction with the carbodi-imides.

(2) The reaction may be carried out at room temperature.

(3) The reaction may be carried out in aqueous medium.

(4) The carbodi-imides form the corresponding disubstituted ureas which are insoluble in water and can be readily separated by filtration.

(5) There is no salt formed; the glutamine may be recovered readily by crystallization.

(6) The metal may readily be removed from the glutamine complex.

We claim as our invention:

1. Process of producing L-glutamine from L-glutamic acid, which comprises forming a multivalent heavy metal complex of glutamic acid, reacting this complex with a carbodi-imide, then subjecting the reaction product to ammonolysis and recovering glutamine from the metal complex.

2. Process of producing L-glutamine from L-glutamic acid, which comprises forming a copper complex of glutamic acid, reacting the copper complex with a carbodi-imide, then reacting the reaction product with ammonia to form the copper complex of glutamine and recovering glutamine from said last named complex.

3. Process of producing L-glutamine from L-glutamic acid, which comprises reacting glutamic acid with an aqueous suspension of cupric hydroxide to form a copper complex of glutamic acid, reacting said complex in aqueous solution with a carbodi-imide, subjecting the last named reaction product to ammonolysis to yield a copper complex of glutamine and recovering glutamine from said last-named complex.

4. Process of producing L-glutamine from L-glutamic acid which comprises reacting L-glutamic acid with an aqueous suspension of an excess of cupric hydroxide to form an aqueous solution of a copper complex of glutamic acid, filtering off excess cupric hydroxide, reacting the solution with dicyclohexyl carbodi-imide, then adding ammonium hydroxide to the reaction mixture to form a copper complex of glutamine and an insoluble substituted urea, separating off the insoluble urea and recovering glutamine from said last named copper complex.

References Cited in the file of this patent
Pfeiffer et al.: Chem. Abs., vol. 31 (1937), p. 4651.